United States Patent
Ambat et al.

(10) Patent No.: US 8,627,035 B2
(45) Date of Patent: Jan. 7, 2014

(54) DYNAMIC STORAGE TIERING

(75) Inventors: Gopakumar Ambat, Bangalore (IN); Vishwanath Nagalingappa Hawargi, Bangalore (IN); Yask Sharma, Bangalore (IN)

(73) Assignee: LSI Corporation, San Jose, CA (US)

( * ) Notice: Subject to any disclaimer, the term of this patent is extended or adjusted under 35 U.S.C. 154(b) by 246 days.

(21) Appl. No.: 13/184,939

(22) Filed: Jul. 18, 2011

(65) Prior Publication Data

US 2013/0024650 A1 Jan. 24, 2013

(51) Int. Cl.
*G06F 12/08* (2006.01)

(52) U.S. Cl.
USPC .................... 711/165; 711/117; 711/E12.019

(58) Field of Classification Search
USPC ........... 711/117, 126, 165, E12.016, E12.019
See application file for complete search history.

(56) References Cited

U.S. PATENT DOCUMENTS

| | | | | |
|---|---|---|---|---|
| 8,359,444 B2* | 1/2013 | Arakawa | ........................ | 711/165 |
| 8,370,597 B1* | 2/2013 | Chatterjee et al. | ............. | 711/170 |
| 2003/0110357 A1* | 6/2003 | Nguyen et al. | ................ | 711/136 |
| 2005/0246503 A1* | 11/2005 | Fair | ................ | 711/147 |
| 2006/0004957 A1* | 1/2006 | Hand et al. | ................ | 711/113 |
| 2008/0244239 A1* | 10/2008 | DeWitt et al. | ................ | 712/220 |
| 2009/0150593 A1* | 6/2009 | Hamilton et al. | ............ | 711/101 |
| 2010/0077168 A1* | 3/2010 | Arakawa | ................ | 711/165 |
| 2010/0115204 A1* | 5/2010 | Li et al. | ................ | 711/130 |
| 2011/0197046 A1* | 8/2011 | Chiu et al. | ................ | 711/171 |
| 2012/0023300 A1* | 1/2012 | Tremaine et al. | ............ | 711/162 |
| 2012/0059994 A1* | 3/2012 | Montgomery et al. | ........ | 711/119 |
| 2012/0089782 A1* | 4/2012 | McKean et al. | ............. | 711/122 |
| 2012/0117349 A1* | 5/2012 | Lau et al. | ................ | 711/165 |
| 2012/0246403 A1* | 9/2012 | McHale et al. | ............. | 711/114 |
| 2012/0278511 A1* | 11/2012 | Alatorre et al. | ................ | 710/33 |
| 2012/0317338 A1* | 12/2012 | Yi et al. | ................ | 711/103 |
| 2013/0013850 A1* | 1/2013 | Baderdinni | ................ | 711/103 |

* cited by examiner

*Primary Examiner* — Hal Schnee
(74) *Attorney, Agent, or Firm* — Suiter Swantz pc llo

(57) ABSTRACT

A method for dynamic storage tiering may include, but is not limited to: receiving an input/output (I/O) request from a host device; determining whether the I/O request results in a cache hit; and relocating data associated with the I/O request between a higher-performance storage device and lower-performance storage device according to the determination whether the data associated with the I/O request is stored in a cache.

16 Claims, 1 Drawing Sheet

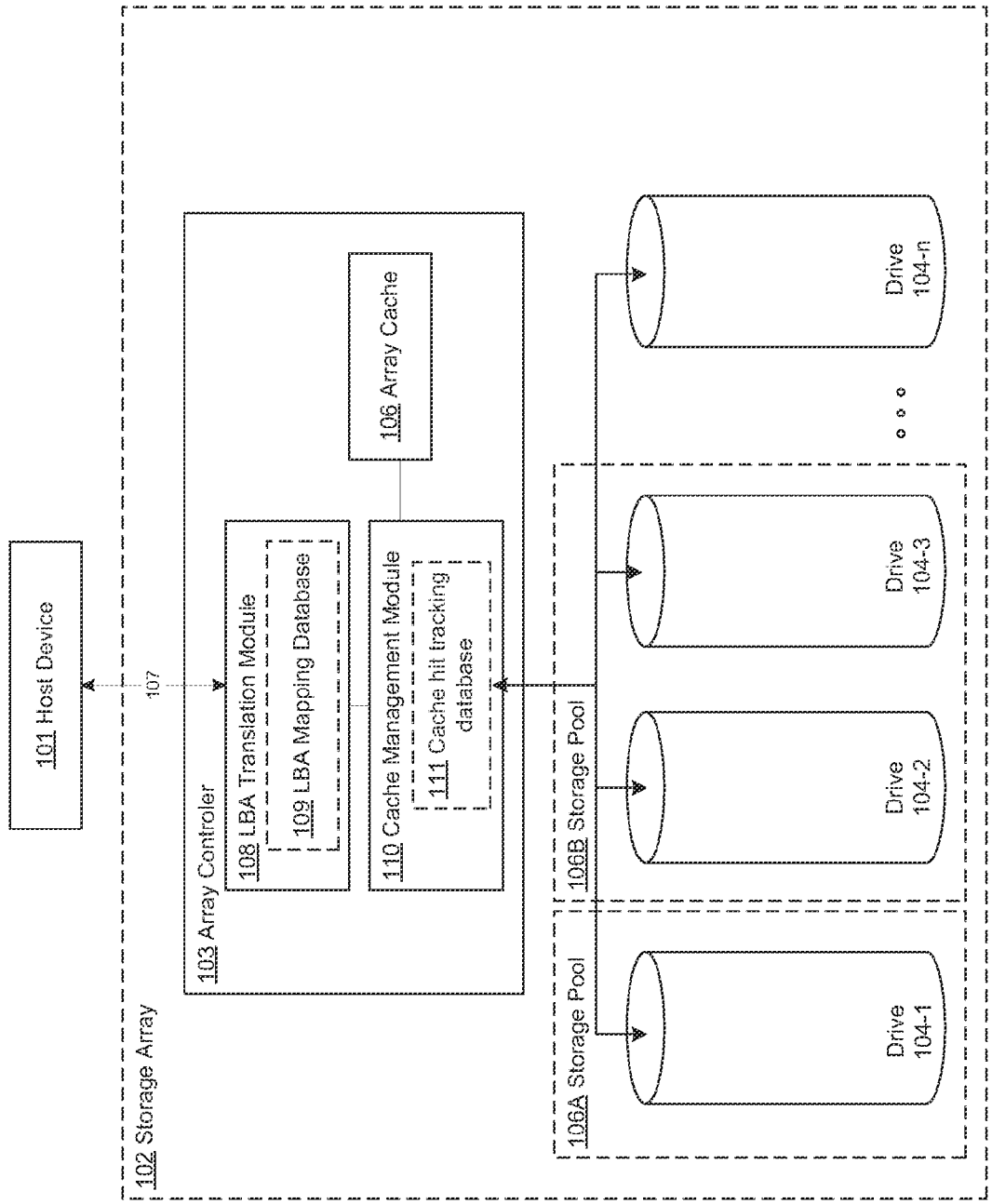

DYNAMIC STORAGE TIERING

BACKGROUND

Data tiering is a hierarchical storage management technique wherein data is moved between high-cost/high-performance storage to low-cost/low performance storage based on the data usage pattern. Dynamic Storage Tiering (DST) is a concept of grouping storage devices into tiers based on their performance characteristics and relocating data dynamically across the devices to leverage their specific capabilities. A DST system performs this relocation while data remains online and accessible.

For performance management, data that has a high activity or load level may be relocated to high performing storage tiers. Alternately, data with a low activity level may be relocated to lower performing storage tiers in order to provide increased capacity in high-performance storage tiers. Such a data movement may be achieved by specialized software that is application/file system aware and resides on host systems (e.g. IBM's Tivoli Storage Manager, Veritas Enterprise Vault etc.) and data movement here is usually at a file level.

SUMMARY

The present disclosure describes systems and methods for dynamic storage tiering.

A method for dynamic storage tiering may include, but is not limited to: receiving an input/output (I/O) request from a host device; determining whether the I/O request results in a cache hit; and relocating data associated with the I/O request between a higher-performance storage device and lower-performance storage device according to the determination whether the data associated with the I/O request is stored in a cache.

BRIEF DESCRIPTION OF THE DRAWINGS

The numerous advantages of the disclosure may be better understood by those skilled in the art by reference to the accompanying figures in which:

FIG. 1 shows system for dynamic storage tiering.

DETAILED DESCRIPTION

The present invention is directed to an automated storage array-based mechanism wherein a quantum of cache hits for logical block addresses (LBAs) on a virtual volume is used to deduce data access activity.

This present invention proposes systems and methods for tracking input/output (I/O) cache hits for logical volumes and using those cache hits as an indicator of the data access activity associated with those blocks and moving data between high performance/cost storage to low performance/cost storage in response to that access activity. For example, logical block addresses (LBAs) within a virtual volume that are being frequently accessed within a volume may be treated as potential candidates for relocation to storage having alternate performance characteristics). Cache hits may be ranked based on how frequently the hits occur and how many hits were recorded and these metrics may be provided to the intelligent system within controller firmware that, in turn, may carry out data tiering operations.

In the following detailed description, reference may be made to the accompanying drawings, which form a part hereof. In the drawings, similar symbols typically identify similar components, unless context dictates otherwise. The illustrative embodiments described in the detailed description, drawings, and claims may be not meant to be limiting. Other embodiments may be utilized, and other changes may be made, without departing from the spirit or scope of the subject matter presented here.

Referring to FIG. 1, an illustrative representation of a mass storage system 100 comprising a host 101 computing device and a storage array 102 including a storage array controller 103, is shown. The storage array controller 103 may include volume management circuitry/software whereby the storage array controller 103 can process read/write requests of the host 101 accessing various logical volumes configured on the storage array 102. The storage array 102 may include n physical drives 104. The physical drives 104 may be grouped into storage pools 105 (e.g. storage pool 105A, storage pool 105B, etc.) according to their relative performance characteristics. A storage pool 105 may be defined as one or more physical drives 104 (or one or more logical partitions of the one or more physical drives 104) which have similar performance characteristics. For example, storage pool 105A (i.e. drive 1) may include high-performance Solid State Drives (SSDs) whereas storage pool 105B (i.e. drive 2 and drive 3) may include lower performance devices such as Serial ATA (SATA) Hard Disk Drives (HDDs). Factors that may distinguish higher-performance storage pools from lower-performance storage pools may include numbers of I/O operations processed per unit time, number of bytes read or written per unit time, and/or average response time for an I/O request.

As described above, in order to enhance overall system performance, it may be desirable to allocate data having a high activity level (e.g. high numbers of I/O requests are addressed to the data) to high performance storage pools 105 (hereinafter referred to as "promotion") while also allocating data with a low activity levels to low performance storage pools 105 (hereinafter referred to as "demotion.")

To affect an efficient dynamic storage tiering solution, the data portions moved between storage pools may be defined by a range of LBAs. Such block-based tiering may overcome problems with file-based tiering solutions. Specifically, if only a portion of a file is accessed regularly, a file system based tiering solution may fail to relegate the un-accessed portion of the file to a lower performing storage pool 105. The use of block-based tiering may allow for relegation of such un-accessed parts of the file despite the regular access remaining portions of the file.

An LBA range characterized by a significant activity load compared to the rest of the LBAs of a virtual volume may be referred to as a hot-spot. Alternately, data that is accessed infrequently may be referred to as a cold-spot and may be moved to a lower-performance storage pool utilizing the same systems and methods as described herein with respect to hot-spot movement.

As described below, a hot-spot may be identified by the storage array controller 103 by monitoring the presence or absence of data associated with an I/O request received from the host 101 within an array cache 106.

For example, during operation of the mass storage system 100, the storage array controller 103 may receive one or more I/O requests 107 from a host 101. Upon receipt of an I/O request 107 from a host 101, the storage array controller 103 may determine whether data associated with the I/O request 107 is presently maintained in the array cache 106. The storage array controller 103 may include an LBA translator module 108 configured to allocate data across the various drives 104 of the storage array 102. Upon receipt of a write request 107, the LBA translator module 108 may store the data associated with the write request 107 across the LBAs of various drives 104 according to a designated allocation procedure and record the respective mapping of that data in an LBA mapping database 109. Upon, receipt of a read request 107, the LBA translator module 108 may determine the LBAs of the various drives 104 containing data associated with the read request 107 from the LBA mapping database 109 and return that data to the host 101.

The storage array controller 103 may further include a cache management module 110 configured for directing the storage of recently accessed data to the array cache 106 for rapid retrieval by the host 101. For example, assuming that an I/O request 107 was determined by the cache management module 110 to be the first read request for a given LBA range, the I/O request 107 would not result in a cache hit and the data associated with the LBA range is read out from disk and copied to the array cache 106. Subsequently, when another read request 107 to the same LBA range is received, a cache hit may be recognized by the cache management module 110 and I/O request 107 is redirected to the array cache 106 where the data associated with the I/O request 107 is retrieved.

As described above, such cache hits may serve as a metric for identifying the frequency of data block access and reallocating data blocks accordingly across storage devices having various performance characteristics. Towards this end, a mechanism to track blocks that are frequently requested is proposed. Referring again to FIG. 1, the cache management module 110 may further include a cache hit tracking database 111. The cache hit tracking database 111 may store data regarding the number of cache hits associated with various LBAs of the drives 104. The cache hit tracking database 111 may maintain various data structures for tracking cache hits. For example, such a clusterHitStruct data structure for a given clusterID for an LBA range (i.e. a "cluster") may be as follows:

```
struct{
    UINT64_hitCount;
    time_t_lastHitTime;
    UINT64_hitFrequency;
} clusterHitStruct;
``` where hitCount is a count of I/O requests 107 associated with a given LBA range, hitFrequency is a frequency of hits to that LBA range and t_lastHitTime is a system clock time associated with a most recent cache hit associated with the LBA range. The size of the LBA range associated with a clusterHitStruct data structure may be user-configurable to allow for adaptable granularity of data migration management.

Upon receipt of an I/O request 107 associated with a given LBA range, the cache management module 110 may determine if a cache hit results and, if so, may increment the hitCount value of the clusterHitStruct data structure and modify the hitFrequency value accordingly.

The cache management module 110 may monitor the state of the cache hit tracking database 111. Upon exceeding a cache hit threshold (e.g. exceeding a specified number of cache hits, exceeding a specified cache hit frequency, etc.), for a particular LBA range in a given storage pool 105 those LBAs may be designated as a hot-spot and subject to relocation to a storage pool having enhanced performance characteristics. Alternately, LBAs ranges having cache hit values below a threshold (e.g. less than a specified number of cache hits, failing to meet a specified cache hit frequency, etc.), for a particular LBA range in a given storage pool 105 those LBAs may be designated as a cold-spot and subject to relocation to a storage pool having lesser performance characteristics.

LBA ranges that are infrequently accessed as reflected by a) clusterIDs having very low hitCount and/or b) clusterIDs having no entry in the map. The former case implies that read I/Os on the LBA range within a specific cluster is very low and the latter implies that no read I/Os have ever occurred on the cluster. In either case, when low ranked clusters are detected by the cache management module 110, the cache management module 110 may move the data associated with those clusters from high-performance storage pool 105A a low performance storage pool 105B. Conversely, if a high hit count is detected by the cache management module 110 for a cluster residing on low performance disks, the cache management module 110 may move the data of that cluster to high performance disks. Varying levels of data tiering (e.g. high/medium/low) may be employed providing an additional input factor to consider before moving low ranking clusters.

The cache management module 110 may apply additional sampling logic on deciding which clusters to move between high performance & low performance disks. A weighting may be applied to clusters depending on when the last hit on the cluster was detected and/or the hit count on adjacent clusters. Such a weighting scheme may come into play when there are many clusters to be moved around but there aren't enough free blocks within the desired storage pool 105. For example, a weighting W may be a function:

$$W = f(hit\_count, hit\_time, hit\_frequency, hit\_frequency\_and\_count\_of\_adjacent\_clusters)$$

The data movement mechanism may be further enhanced to ensure that specific administrator-initiated activities result in data allocation from a particular performance storage tier. For example, when administrator initiates a snapshot on a volume the snapshot repository may stored on a lower performance disks. In this scenario, the above described cache hit-based data migration methodologies would be disregarded and the specific operation being performed on a volume may dictate the performance tier being used.

Additionally, the caching algorithm itself may be enhanced to monitor for data blocks/clusters that have a huge cache hits and ensure that those blocks are never cleared from the cache.

It is notable that the solution proposed here operates at the block level and may not require any host based software. As such, the solution may be agnostic to the host or the host based application that is accessing the data blocks. No software porting across platforms may be required. Additionally, all metadata related to the frequently used blocks may be stored on the storage array 102 itself in a persistent store and hence available across reboots and recoverable even in the case of a catastrophic failure.

The solution proposed here being block based overcomes problems with typical file system-based tiering solutions. Specifically, if only a part of a file is accessed regularly, the file system-based tiering solutions may not mark the un-accessed part of the file for tiering. With the proposed solution, since the firmware is agnostic about the contents of the data blocks very fine tiering can be achieved with un-accessed parts of a file being moved to lower performance storage.

Further, the solution proposed here may be entirely automated with a storage administrator only having to mark out the logical volumes for which the cache hits are to be tracked and the size of the LBA ranges to be monitored for potential relocation. Once enabled, the controller firmware may automatically trigger data movement at the backend for un-accessed (or lesser accessed) LBAs. Conversely, since the data relocation system proposed herein is based on cache hits, when a data block located on a lower performance storage starts having a higher cache hit, those data blocks may be moved back to higher performance storage.

It is believed that the present invention and many of its attendant advantages will be understood by the foregoing description. It may be also believed that it will be apparent that various changes may be made in the form, construction and arrangement of the components thereof without departing from the scope and spirit of the invention or without sacrificing all of its material advantages. The form herein before described being merely an explanatory embodiment thereof. It may be the intention of the following claims to encompass and include such changes.

The foregoing detailed description may include set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

In addition, those skilled in the art will appreciate that the mechanisms of the subject matter described herein may be capable of being distributed as a program product in a variety of forms, and that an illustrative embodiment of the subject matter described herein applies regardless of the particular type of signal bearing medium used to actually carry out the distribution. Examples of a signal bearing medium include, but may be not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

Those having skill in the art will recognize that the state of the art may include progressed to the point where there may be little distinction left between hardware, software, and/or firmware implementations of aspects of systems; the use of hardware, software, and/or firmware may be generally (but not always, in that in certain contexts the choice between hardware and software may become significant) a design choice representing cost vs. efficiency tradeoffs. Those having skill in the art will appreciate that there may be various vehicles by which processes and/or systems and/or other technologies described herein may be effected (e.g., hardware, software, and/or firmware), and that the preferred vehicle will vary with the context in which the processes and/or systems and/or other technologies may be deployed. For example, if an implementer determines that speed and accuracy may be paramount, the implementer may opt for a mainly hardware and/or firmware vehicle; alternatively, if flexibility may be paramount, the implementer may opt for a mainly software implementation; or, yet again alternatively, the implementer may opt for some combination of hardware, software, and/or firmware. Hence, there may be several possible vehicles by which the processes and/or devices and/or other technologies described herein may be effected, none of which may be inherently superior to the other in that any vehicle to be utilized may be a choice dependent upon the context in which the vehicle will be deployed and the specific concerns (e.g., speed, flexibility, or predictability) of the implementer, any of which may vary. Those skilled in the art will recognize that optical aspects of implementations will typically employ optically oriented hardware, software, and or firmware.

What is claimed is:

1. A method for dynamic storage tiering comprising:
    receiving an input/output (I/O) request from a host device;
    determining whether the I/O request results in a cache hit;
    comparing at least one of a number of cache hits associated with data associated with the I/O request or a frequency of cache hits associated with data associated with the I/O request to a threshold range; and
    relocating data associated with the I/O request between a higher-performance storage device and lower-performance storage device according to a comparison of at least one of a number of cache hits associated with data associated with the I/O request or a frequency of cache hits associated with data associated with the I/O request to a threshold range.

2. The method of claim 1, wherein the data associated with the I/O request comprises logical block address (LBA)-level data.

3. The method of claim 2,
    wherein the determining whether the I/O request results in a cache hit further comprises:
        applying a weighting to a first LBA range according to cache hit data associated with the first LBA range; and
        applying a weighting to a second LBA range according to cache hit data associated with the second LBA range, and
    wherein the relocating data associated with the I/O request between a higher-performance storage device and lower-performance storage device according to a comparison of at least one of a number of cache hits associated with data associated with the I/O request or a frequency of cache hits associated with data associated with the I/O request to a threshold range further comprises:
        relocating either the first LBA range or the second LBA range according to relative weightings of the first LBA range and the second LBA range.

4. The method of claim 3, wherein the first LBA range is adjacent to the second LBA range.

5. The method of claim 3, wherein a weighting is a function of at least one of: a cache hit count associated with the LBA range; a cache hit time; a cache hit frequency; or a cache hit count associated with a second LBA range adjacent to the LBA range.

6. The method of claim 1, further comprising:
    receiving a user input;

retaining data associated with the I/O request in a present storage location when at least one of a number of cache hits associated with data associated with the I/O request and a frequency of cache hits associated with data associated with the I/O is outside a user-defined threshold range.

7. The method of claim 6, wherein the user input is indicative of a volume snapshot operation.

8. The method of claim 6, wherein the present storage location is a lower performance storage location.

9. A system for dynamic storage tiering comprising:
   means for receiving an input/output (I/O) request from a host device;
   means for determining whether the I/O request results in a cache hit;
   means for comparing at least one of a number of cache hits associated with data associated with the I/O request or a frequency of cache hits associated with data associated with the I/O request to a threshold range; and
   means for relocating data associated with the I/O request between a higher-performance storage device and lower-performance storage device according to a comparison of at least one of a number of cache hits associated with data associated with the I/O request or a frequency of cache hits associated with data associated with the I/O request to a threshold range.

10. The system of claim 9, wherein the data associated with the I/O request comprises logical block address (LBA)-level data.

11. The system of claim 10,
    wherein the means for determining whether the I/O request results in a cache hit further comprises:
       means for applying a weighting to a first LBA range according to cache hit data associated with the first LBA range; and
       means for applying a weighting to a second LBA range according to cache hit data associated with the second LBA range, and
    wherein the means for relocating data associated with the I/O request between a higher-performance storage device and lower-performance storage device according to a comparison of at least one of a number of cache hits associated with data associated with the I/O request or a frequency of cache hits associated with data associated with the I/O request to a threshold range further comprises:
       means for relocating either the first LBA range or the second LBA range according to relative weightings of the first LBA range and the second LBA range.

12. The system of claim 11, wherein the first LBA range is adjacent to the second LBA range.

13. The system of claim 11, wherein a weighting is a function of at least one of: a cache hit count associated with the LBA range; a cache hit time; a cache hit frequency; or a cache hit count associated with a second LBA range adjacent to the LBA range.

14. The system of claim 9, further comprising:
    means for receiving a user input;
    means for retaining data associated with the I/O request in a present storage location when at least one of a number of cache hits associated with data associated with the I/O request and a frequency of cache hits associated with data associated with the I/O is outside a user-defined threshold range.

15. The system of claim 14, wherein the user input is indicative of a volume snapshot operation.

16. The system of claim 14, wherein the present storage location is a lower performance storage location.

\* \* \* \* \*